A. W. H. WARSHAVSKY.
FLYING MACHINE.
APPLICATION FILED APR. 18, 1905.
944,301.
Patented Dec. 28, 1909.
3 SHEETS—SHEET 3.
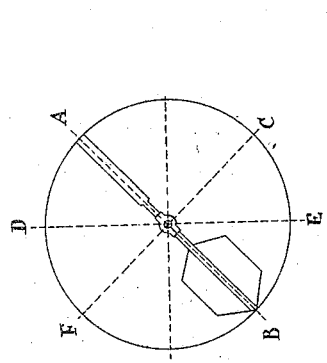
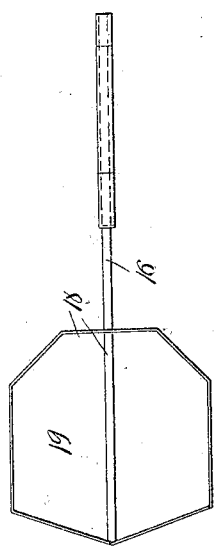
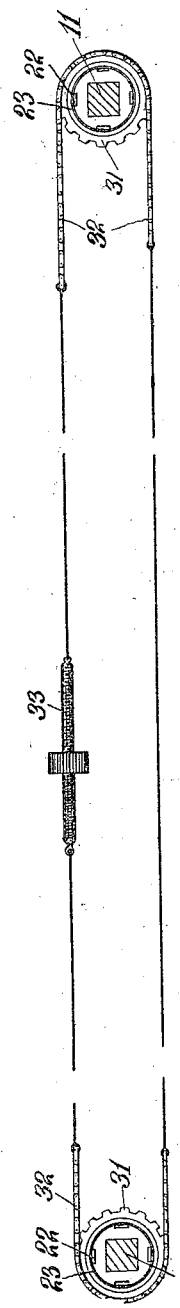
Aaron W Harris Warshavsky Inventor

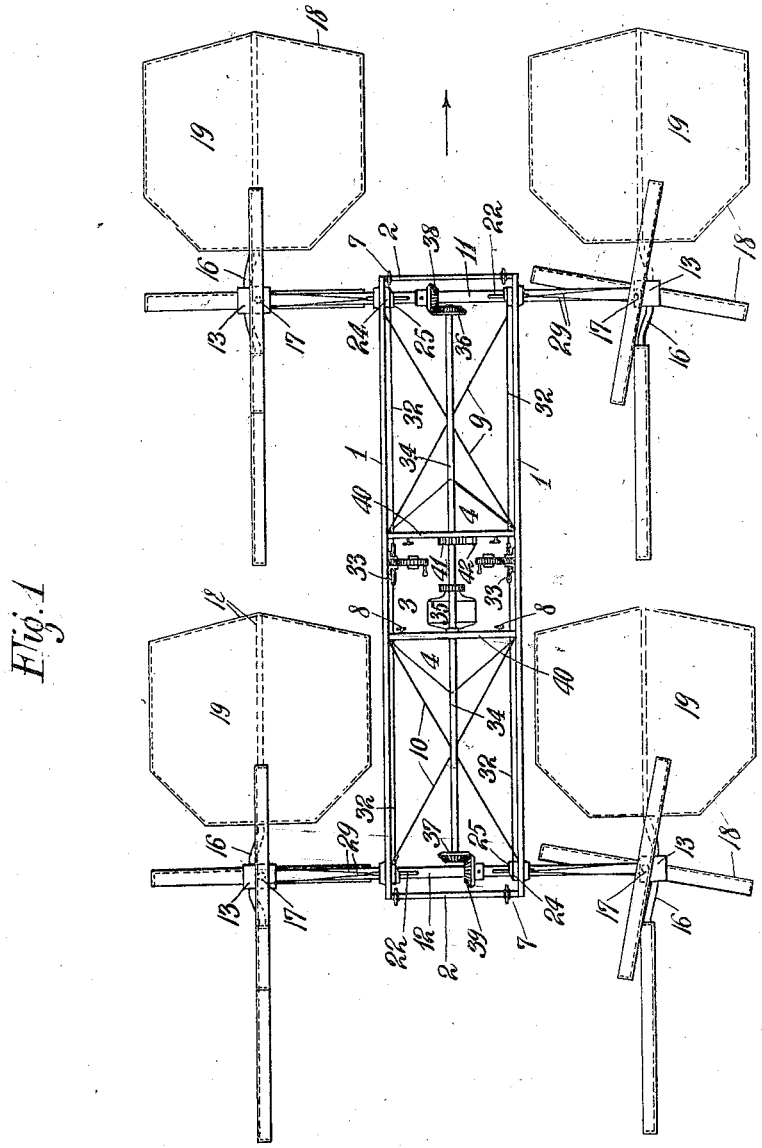

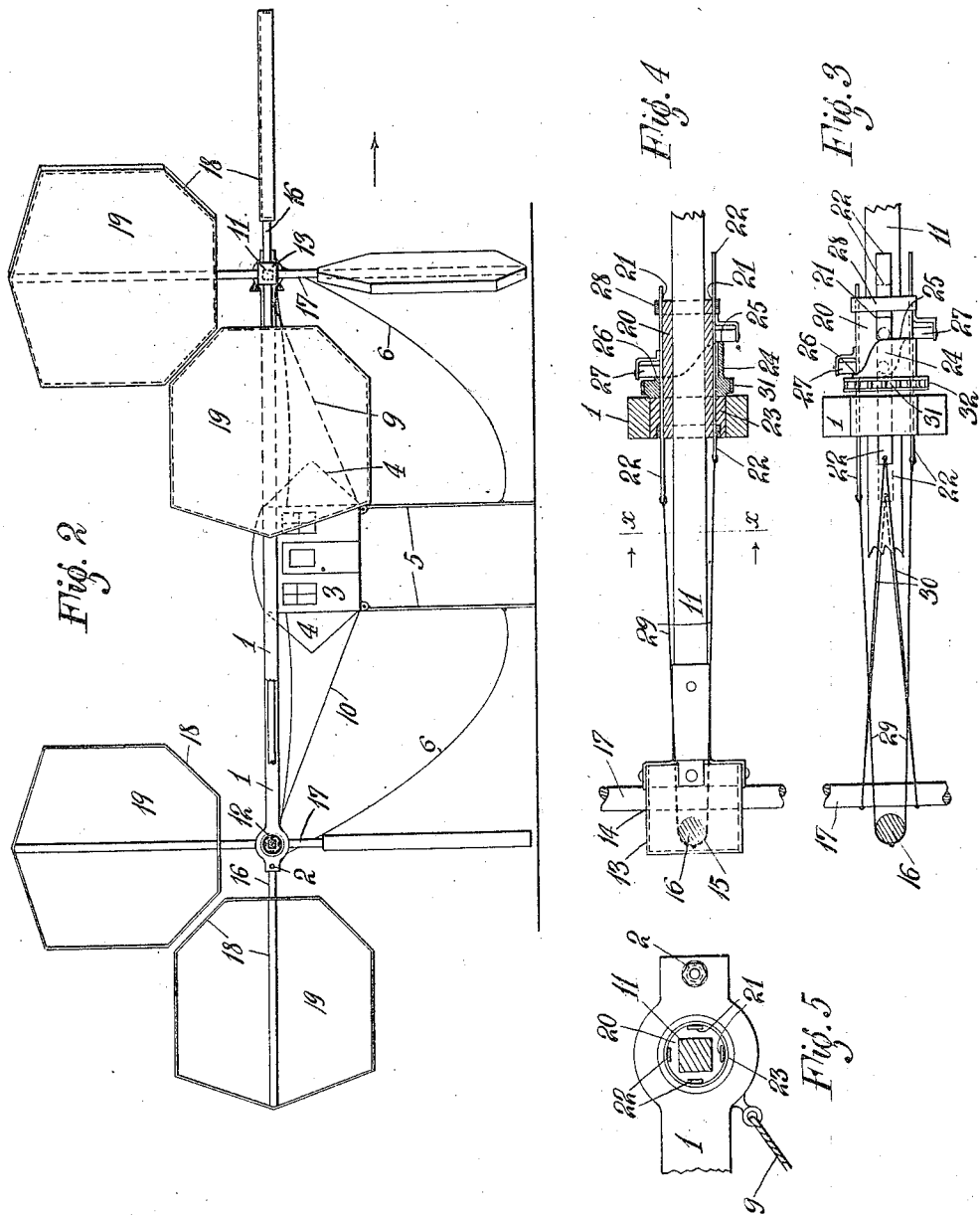

UNITED STATES PATENT OFFICE.

AARON W. HARRIS WARSHAVSKY, OF NEW YORK, N. Y.

FLYING-MACHINE.

944,301.

Specification of Letters Patent.  Patented Dec. 28, 1909.

Application filed April 18, 1905. Serial No. 256,216.

*To all whom it may concern:*

Be it known that I, AARON W. HARRIS WARSHAVSKY, a citizen of the United States of America, and a resident of the city, county, and State of New York, have invented certain new and useful Improvements in Flying-Machines, of which the following is a specification.

My invention relates to flying machines, and comprises the features of construction and arrangement of parts hereinafter described.

Broadly stated, my invention comprises a main frame with shafts rotatable thereon and carrying at their outer ends members capable of having imparted to them an independent motion. These members, in turn, have secured to their ends wings preferably disposed at right angles to each other. In order to maintain the balance of the machine and to guard against torsional strains, I provide means for maintaining corresponding wings carried by the shafts on the same side of the machine in parallel planes. The members carrying the wings can be independently adjusted so that the wings will produce a maximum lifting, driving, sinking or reversing force as desired. Furthermore, I provide means on each side of the machine for so regulating the driving arc of the wings on either side as to result in a complete control of the direction in which it is desired to move without employing a rudder or other auxiliary steering device.

In the accompanying drawings I have illustrated my invention in a preferred form, but I desire it to be understood that my invention is not limited to the precise arrangement of parts or structural features there shown, but is to be construed broadly in accordance with the spirit of the invention.

In these drawings: Figure 1 is a top plan view of a machine employing my invention. Fig. 2 is a side elevation of the same. Fig. 3 is a detail view showing the manner in which I impart an independent motion to the members carrying the wings. Fig. 4 is a view similar to Fig. 3, parts being shown in section. Fig. 5 is a detail view on line *x—x* of Fig. 4. Fig. 6 is a detail view of one of the wing carrying members. Fig. 7 is a detail view of the means for adjusting the position of the wings. Fig. 8 is a diagrammatical view illustrating the action of the wings.

Like parts in the several views are indicated by like characters of reference.

For convenience sake, I will describe the machine as having a fore and after end in accordance with the arrow indication, but it will of course be understood from an inspection of the drawings and a perusal of the following description that the machine is practically double ended and can be navigated in either direction.

The main frame of the machine, of a suitable material, is comprised of the side bars 1 joined at their fore and after ends by the braces 2. Suspended from the center of the main frame is the car 3 provided with wind breakers 4 and the supports or legs 5 which are hinged to each lower corner of the car and are adapted to keep the wings from contact with the earth when the car is at rest. When navigating, these supports can be drawn up by the ropes 6 running over the sheave 7 on the frame and made fast to the cleats 8 in the car. The latter is more rigidly secured in position by the cables 9 and 10 running to the fore and after ends of the frame respectively. The weight of operating or other mechanism is disposed as near the bottom of the car as possible in order to lower the center of gravity of the machine and thereby counteract any pitching or rolling tendency. Furthermore, the frame and car are in practice so constructed as to minimize any tendency of the frame to sag or hog.

Mounted upon the main frame 1 at its fore and after ends are parallel shafts 11 and 12, each free to rotate and each carrying at its outboard ends two pairs of wings which of course rotate with the shafts. The latter are extended outboard from the main frame a sufficient distance to allow for clearance of the wings. Since the structure and mode of operation of each set of wings carried by the shafts is the same, it will be understood that the following description of one such set will suffice for all. The wings may be variously formed and secured to the shaft. In this case I secure to the outboard ends of the shafts a box or cannon 13 provided with bearings 14 and 15, not, in this instance, in the same plane, and formed on opposite sides of the box. Through these bearings and free to turn or oscillate thereon, extend the members 16 and 17 carrying the frames 18 over which are stretched the wings 19 of any light, stiff material such as silk or ramie.

It will be readily understood that as the members 16 and 17 rotate carrying with them the wings, the latter will be effective for lifting and driving the machine only when acting through an arc of approximately 180°. If the members 16 and 17 in continuing their rotation were fixed and not free to turn or oscillate, the wings while passing through the remaining arc of 180° would neutralize the effective work they had performed and would tend to sink and retard in like manner and in the same degree that they had previously tended to raise and drive the machine. Or, since each member is provided at either end with a wing, the wing in the effective arc would be neutralized by the resistance of its mate in the opposite or ineffective arc. Of course, the term "effective arc" will be defined by the immediate object which the operator has in view. Broadly, this arc comprises, when it is desired to forge the machine ahead, the arcs in passing through which the wings tend to raise and drive the machine. If on the other hand, it should be desired to reverse or sink the machine, the "effective arc" would be that in which the wings were utilized to their maximum extent to sink and retard or reverse the machine. To overcome the neutralizing effect above outlined, I provide means for turning the members 16 and 17 so that as they enter the effective arc, the face of the wings will form the acting surface for lifting, driving, sinking or reversing as the case may be and for again turning the members as they enter the ineffective arc so that only the edges of the wings will be presented to resist the upward, forward, downward or backward movements respectively of the machine. By attaching the wings at either end of the members 16 and 17 so that their planes are always at right angles, this turning movement of the members need only extend through an arc of 90° in changing from the maximum to minimum surface of wing presented to the atmosphere, or vice versa.

The independent turning of the members 16 and 17 may be variously accomplished. For instance, I have here shown the sleeve 20 carried by the shaft and grooved on the oposite sides as at 21 for the reception of rods 22 held in position in said grooves by bushing 23 and free to move inboard or outboard in the grooves. Mounted on the frame and fixed in relation to the shaft and sleeve is a collar 24 provided with a cam face 25 and a cut away portion 26 on the opposite side corresponding to said cam. The pins 27 attached to rods 22 bear against the cam face of the collar and are thereby given an inboard motion at certain periods during their rotation with the sleeve and shaft. Undue movement inboard is prevented by ring stop 28. Connections are made with the rods 22 and the members 16 and 17 as by a pair of chains or cables 29 and 30 passing around the members and secured thereto in such a manner that when the rods 22 are moved inboard by the action of the cam and pin, the latter will move the members through an arc proportional to the height of the cam and turn the members with a degree of abruptness depending upon the angle of the cam.

In steering or maneuvering, it is frequently desired to use a greater driving power on the port or starboard side to drive the head of the machine to port or starboard. This end may be attained by decreasing the driving arc on the side toward which it is desired to turn the head of the machine, or by increasing the driving arc on the opposite side. Or the result may be gained by increasing the resistance on either side toward which it is desired to head the machine. Again, it may be desired to decrease or increase the driving arc with reference to the lifting arc as when starting from or coming to a position of rest. All these results may be accomplished by varying the point at which the members 16 and 17 are turned during their rotation with the shaft. In the present instance, I accomplish this by the following means for shifting the collar 24 in such manner that the members 16 and 17 will be moved at a convenient point of the rotation of the shafts as may be desired. On the collar, I form the teeth 31 and over the collar and engaging with said teeth I pass the chain 32. By moving the chain I can thereby regulate the position of the cams accurately and quickly with a minimum expenditure of power. Of course a cable could be substituted for a chain and fastened in proper position.

For reasons hereinbefore mentioned, it is desirable to maintain the corresponding wings carried by the shafts on the same side of the machine in parallel planes. This will be done when the positions of the collars and their cams on the shafts 11 and 12 are always maintained in the same relative position. I therefore pass the chain 32 over the teeth formed in both collars and lead it to an endless screw 33 located inside the car and readily accessible. Whenever this chain on the port side of the machine is operated, it will effect equally the corresponding wings on the port side of the fore and after shafts, and therefore keep them constantly in parallel planes. The same holds true when the chain on the starboard side is operated, the corresponding wings on the starboard side of the fore and after shafts being kept in parallel planes since the chain, whenever operated, shifts the collars and cams on the shafts 11 and 12 to an equal extent. By operating the chain on either the port or starboard side, the cams on that side may be so shifted in relation to the pins on which they act that the members 16 and 17 will be moved at such a point of the rotation of the shafts 11 and 12 that the wings will exert more or less force on the port or starboard side as may be desired, thus steering the machine without the necessity of a rudder or other auxiliary device. When it is desired to utilize the wings for lifting or depressing the machine, as for instance to ascend or descend to or from the earth in a vertical direction, the chains on each side may be operated to a like degree, thereby shifting the cams on each side to the same relative position, but nevertheless enabling them to so turn the wings on both sides that the latter will be utilized entirely for a depressing or lifting effect.

The shafts 11 and 12 may be rotated by any suitable means and are preferably driven at all times in the same direction. I have here shown them rotated by means of the drive shaft 34 extending through the car and operated by any suitable means as a motor 35. At the fore and after ends of the drive shaft I provide the beveled gears 36 and 37 meshing with the oppositely disposed beveled gears 38 and 39 on the shafts 11 and 12 thereby driving the latter in the same direction. The drive shaft 34 rests in bearings formed on the auxiliary braces 40 connecting the side bars of the frame. By reversing the rotation of the shaft 34, the direction of travel of the machine will of course be reversed, but the parts work in the same manner, my machine being practically double ended. The wings are so constructed in practice, that the edge farthest from the shaft on which they rotate is of considerable width to thoroughly grasp the air in its revolutions.

The manner in which the wings may be utilized to entirely sustain, and at the same time propel and steer the machine, will perhaps be more fully understood from an inspection of Fig. 8 which illustrates diagrammatically the rotation of one of the wings. As has been stated, the effective arc of the wing is always approximately 180 degrees, or for one half of its revolution. If now the wing be adjusted so that its effective arc will take place between the points A and B, the wing will exert a maximum lifting and propelling force. While the wing is passing downward from the point A to the point C it is exerting a sustaining power, and from the point C to the point B it is exerting a propelling power. The effective arc in this case is thus subdivided into a lifting arc and a propelling arc. If now the wing be adjusted so that its effective arc shall occur between the points D and E, then between the points D and A, the wing exerts a retarding effect; from the point A to C it would exert a lifting effect; from the point C to E the wing would exert a forward propelling effect. The forward propelling effect would counteract the retarding effect and the ship would be supported substantially motionless in the air. If now the effective arc were still further retarded so as to take place between the points F and C, then from the point F to A, the wing would exert a retarding effect, and from the point A to C, a sustaining effect. In this case the machine would be driven backward. The cams or other devices for regulating the effective arc of the wings are preferably limited in their adjustment so that the effective arc may be adjusted for substantially three-quarters of the revolution of the wing, that is between the points F and B. By reason of this limitation of adjustment it will be apparent that at that part of the arc between the points A and C the wings are always exerting a lifting power. Therefore the lifting force of the wings (i. e. that portion of the revolution between the points A and C) is always constant, and the wings always exert a constant sustaining force (dependent of course upon the speed of revolution), regardless of whether the wings are exerting a forward or rearward propelling force, or a combination of the two. Thus the ship may be maneuvered and steered by means of the wings, at the same time that the wings are being utilized to support the machine, as the lifting arc is always constant.

Various auxiliary devices may of course be provided, as, for instance, a brake on the drive shaft 34 which operates to graduate the rotation of the latter in such a manner that the wings can be stopped in a position where they will act as kites and permit an easy and gradual descent of the machine to the earth in case of accident. The brake in this instance takes the form of a ratchet 41 and pawl 42.

It will thus be seen that I can utilize the wings for a maximum lifting, driving, depressing or retarding power as desired, that by means of the chain 32 I can steer the machine to port or starboard by regulating the cams and through them the members 16 and 17 and the driving arcs of the wings, that I can reverse or attain any desired speed ahead or astern, and that all movements of the machine are easily and effectively controlled to any desired degree at any time while the machine is in action.

What I claim is:

1. A flying machine comprising a main frame, rotatable shafts mounted thereon, means for rotating said shafts, members carried by said shafts and free to turn on their own axes, wings secured to each end of said members, pins revolving with said shafts, connections leading from the pins to said members, collars provided with cams fixed with relation to said shafts and adapted to act on said pins to move them inboard at predetermined periods during the rotation of the shafts, teeth on said collars, a chain passing over the collars on the same side of the machine and engaging with their teeth, an endless screw adapted to operate said chain to move the collars on one side of the machine an equal distance to maintain corresponding wings carried by the shafts on the same side of the machine in parallel planes.

2. A flying machine comprising a main frame, rotatable shafts mounted thereon, means for rotating said shafts, members carried by said shafts free to turn on their own axes, wings secured to each end of said members, sleeves secured to said shafts, pins movably carried by said sleeves, connections leading from the pins to said members, collars provided with cams fixed with relation to said sleeves and shafts, adapted to act on said pins to move them inboard at predetermined periods during the rotation of the shafts, teeth on said collars, chains passing over said collars engaging with the teeth, and means adapted to operate said chains to move the collars and thereby change the point at which the cams act upon said pins during the rotation of the shafts.

3. A flying machine comprising a main frame, rotatable shafts mounted thereon, means for rotating said shafts, members carried by the said shafts and free to turn on their own axes, wings secured to each end of said members, sleeves secured to said shafts, pins movably carried by the opposite sides of said sleeves and revolving therewith, connections leading from the pins to said members, collars fixed with relation to said shafts and provided with cams adapted to act successively on said pins to move them inboard at predetermined periods during the rotation of the shafts, said collars having cut away portions corresponding to said cams and on the side opposite thereto adapted to allow certain of said pins to move outboard to loosen the connections to certain of said members when the pins on the opposite sides of the sleeves act upon said cams.

4. A flying machine comprising a main frame, rotatable shafts mounted thereon, means for rotating said shafts, members carried by the shafts and free to turn on their own axes, wings secured to each end of said members, sleeves secured to said shafts, pins movably carried by the opposite sides of said sleeves and revolving therewith, connections leading from the pins to said members, collars fixed with relation to said shafts and provided with cams adapted to act successively on said pins to move them inboard at predetermined periods during the rotation of the shafts, said collars having cut away portions corresponding to the cams and on the side opposite thereto adapted to allow certain of said pins to move outboard to loosen the connections to certain of said members when the pins on the opposite sides of the sleeves act upon said cams, and means adapted to move the collars to vary the point at which the cams act on the pins during the rotation of the shafts.

5. A flying machine comprising a main frame, rotatable shafts mounted thereon, means for rotating said shafts, members carried by said shafts and free to turn on their own axes, wings secured to each end of said members, sleeves secured to said shafts, pins movably carried by the opposite sides of said sleeves and revolving therewith, connections leading from the pins to said members, collars fixed with relation to said shafts and provided with cams adapted to act successively on said pins to move them inboard at predetermined periods during the rotation of the shafts, said collars having cut away portions corresponding to said cams and on the sides opposite thereto adapted to allow certain of the pins to move outboard to loosen the connections to certain of said members when the pins on the opposite sides of the sleeves act upon the cams, teeth on the collars, chains passing over said collars and engaging with the teeth, and means adapted to operate said chains to move the collars and thereby change the point at which the cams act upon said pins during the rotation of the shafts.

6. A flying machine comprising a main frame, rotatable shafts mounted thereon, means for rotating said shafts, members carried by said shafts and free to turn on their own axes, wings secured to each end of said members, sleeves secured to said shafts, pins movably carried by the opposite sides of said sleeves and revolving therewith, connections leading from the pins to said members, collars provided with cams fixed with relation to said shafts and adapted to act on said pins to move them inboard at predetermined periods during the rotation of the shafts, said collars having cut away portions corresponding to said cams on the sides opposite thereto adapted to allow certain of the pins to move outboard to loosen the connections to said members when the pins on the opposite sides of the sleeves act upon the same, teeth on said collars, a chain passing over the collars on the same side of the machine and engaging with their teeth, an endless screw adapted to operate said chain to move the collars on one side of the machine an equal distance to maintain corresponding wings carried by the shafts on the same side of the machine in parallel planes.

7. A flying machine comprising a main frame, rotatable shafts mounted thereon, means for rotating said shafts, members carried by said shafts free to turn on their own axes, wings secured to each end of said members and having their planes fixed at right angles to each other, sleeves secured to said shafts, pins movably carried by said sleeves, connections leading from the pins to said members, collars provided with cams fixed with relation to said sleeves and shafts, adapted to act on said pins to move them inboard at predetermined periods during the rotation of the shafts, teeth on said collars, chains passing over said collars engaging with the teeth, and means adapted to operate said chains to move the collars and thereby change the point at which the cams act upon said pins during the rotation of the shafts.

8. A flying machine comprising a main frame, rotatable shafts mounted thereon, means for rotating said shafts, members carried by said shafts and free to turn on their own axes, wings secured to each end of said members and having their planes fixed at right angles to each other, pins revolving with said shafts, connections leading from the pins to said members, collars provided with cams fixed with relation to said shafts and adapted to act on said pins to move them inboard at predetermined periods during the rotation of the shafts, teeth on said collars, chains passing over the collars on the same side of the machine and engaging with their teeth, endless screws adapted to operate said chains to move the collars on one side of the machine an equal distance to maintain corresponding weights carried by the shafts on the same side of the machine in parallel planes.

9. A flying machine comprising a main frame, rotatable shafts mounted thereon, means for rotating said shafts, members carried by the said shafts and free to turn on their own axes, wings secured to each end of said members and having their planes at right angles to each other, sleeves carried by said shafts and having slots on their opposite sides, rods carried by said sleeves free to move inboard or outboard in said slots, connections leading from the rods to said members, pins secured to said rods and revolving with the sleeve and shaft, collars fixed with relation to said sleeves and shafts, cams formed on said collars adapted to act on the pins to move them inboard at predetermined periods during the rotation of the shafts, said collars having cut away portions corresponding to the cams and on the side opposite thereto adapted to allow certain of said pins to move inboard when the cams act upon the pins at the opposite side of the sleeves, and stops adapted to limit the inboard movement of the pins.

10. A flying machine comprising a main frame, rotatable shafts mounted thereon, means for rotating said shafts, members carried by said shafts and free to turn on their own axes, wings secured to each end of said members and having their planes at right angles to each other, sleeves carried by said shafts and having slotted portions on opposite sides thereof, rods carried in said slotted portions and free to move inboard or outboard, connections leading from the rods to said members, pins connected to said rods, collars fixed with relation to the shafts, cams formed on said collars adapted to act on the pins to move them inboard at predetermined periods during the rotation of the shafts, teeth formed on the collars, chains passing over said collars and engaging with the teeth and adapted to move the collars to shift the latter to change the point at which they act upon said pins during the rotation of the shafts.

11. In aerial vessels, a car, an operating shaft, feathering blades secured to the shaft and mounted for rotation in a vertical plane on each side of the car, cams loosely mounted on the operating shaft, tappets connected with the propeller blades and adapted to engage the cams for varying the angle of said blades, means for locking the cams against rotation, a motor, and a connection between the motor and operating shaft for rotating the latter.

12. In an air ship, driven horizontal shafts mounted parallel, wings arranged in pairs on the opposite ends of the shafts, means for turning the wings to alternately present a flat and edge surface, the wings capable of adjustment to lift, lower, propel forward, or rearward and to steer the machine in all directions.

13. In a flying machine, wings mounted on opposite sides of the machine having an effective arc of approximately 180 degrees, and means for altering the relative position of the effective arc to cause the wings to completely sustain, propel and steer the machine.

Signed at New York city this 12th day of April 1905.

AARON W. HARRIS WARSHAVSKY.

Witnesses:
 IVAN KONIGSBERG,
 RAYMOND C. SPAULDING.